(12) United States Patent
Lin et al.

(10) Patent No.: US 11,187,383 B2
(45) Date of Patent: Nov. 30, 2021

(54) PASSIVE DIODE-LIKE DEVICE FOR FLUIDS

(71) Applicant: THE JOHNS HOPKINS UNIVERSITY, Baltimore, MD (US)

(72) Inventors: Sen Lin, Baltimore, MD (US); James Kevin Guest, Lutherville Timonium, MD (US); Takeru Igusa, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 15/709,967

(22) Filed: Sep. 20, 2017

(65) Prior Publication Data

US 2018/0259130 A1     Sep. 13, 2018

Related U.S. Application Data

(63) Continuation of application No. 14/683,657, filed on Apr. 10, 2015, now Pat. No. 9,903,536.

(Continued)

(51) Int. Cl.
*F15C 1/16*     (2006.01)
*F17D 1/16*     (2006.01)
(Continued)

(52) U.S. Cl.
CPC .............. *F17D 1/16* (2013.01); *F15B 13/027* (2013.01); *F15C 1/146* (2013.01); *F15D 1/02* (2013.01);
(Continued)

(58) Field of Classification Search
CPC .......... F17D 1/16; F15B 13/027; F15C 1/146; F15D 1/02; F16K 15/00; F16K 99/0021; F16K 99/0057
(Continued)

(56) References Cited

U.S. PATENT DOCUMENTS 1,329,559 A * 2/1920 Tesla .................. F15C 1/00
                                                    137/842
3,693,646 A * 9/1972 Baker ................ F15C 1/00
                                                    137/842

(Continued)

FOREIGN PATENT DOCUMENTS

DE          29917548 U1 * 1/2000 .......... F04B 53/1077

OTHER PUBLICATIONS

Sochol et al (2013) Single-layer domino diodes via optofluidic lithography for ultra-low reynolds number applications. Proceedings of 26th IEEE Micro Electro Mechanical Systems Conference, pp. 153-156.

(Continued)

*Primary Examiner* — Minh Q Le
(74) *Attorney, Agent, or Firm* — Johns Hopkins Technology Ventures

(57) ABSTRACT

The present invention is directed to an improved fluid diode using topology optimization with Finite Element Method (FEM). Topology optimization as a flexible optimization method has been extended to the fluid field. For given boundary conditions and constraints, it distributes a specific amount of pores (or remove materials to get channel) in the design domain to minimize/maximize an objective function. In this design, inlet and outlet ports are aligned and inflow and outflow are in the same direction. The present invention features an intricate network of fluid channels having optimized fluid connectivity and shapes, which significantly improves the diodicity of fluidic passive valves.

20 Claims, 17 Drawing Sheets

ASPECT RATIO 2:3          ASPECT RATIO 4:3

Related U.S. Application Data

(60) Provisional application No. 62/041,712, filed on Aug. 26, 2014.

(51) Int. Cl.
*F15C 1/14* (2006.01)
*F16K 15/00* (2006.01)
*F15B 13/02* (2006.01)
*F15D 1/02* (2006.01)
*F16K 99/00* (2006.01)

(52) U.S. Cl.
CPC .......... *F16K 15/00* (2013.01); *F16K 99/0021* (2013.01); *F16K 99/0057* (2013.01)

(58) Field of Classification Search
USPC ....... 137/842, 814, 833, 825; 273/58 R, 656, 273/65 D; 251/127, 126, 366, 367; 466/224; 473/610, 611; 446/224
See application file for complete search history.

(56) References Cited

U.S. PATENT DOCUMENTS

| | | | | |
|---|---|---|---|---|
| 4,068,144 | A * | 1/1978 | Toye | B41J 2/03 310/327 |
| 5,265,636 | A * | 11/1993 | Reed | F15C 1/146 137/14 |
| 5,876,187 | A | 3/1999 | Afromowitz | |
| 6,227,809 | B1 | 5/2001 | Forster et al. | |
| 8,291,976 | B2 * | 10/2012 | Schultz | E21B 43/12 137/811 |
| 8,650,877 | B1 * | 2/2014 | Gustafson | F24J 2/265 126/634 |
| 8,910,664 | B2 | 12/2014 | Liao et al. | |
| 9,038,652 | B1 * | 5/2015 | Henry | F16K 15/20 137/223 |
| 9,169,855 | B1 * | 10/2015 | Dyson | F15C 5/00 |
| 9,249,649 | B2 * | 2/2016 | Fripp | E21B 34/08 |
| 9,903,536 | B2 * | 2/2018 | Lin | F17D 1/16 |
| 2011/0102508 | A1 * | 5/2011 | Kim | B41J 2/14233 347/44 |
| 2012/0074600 | A1 | 3/2012 | Kellermann | |
| 2013/0140038 | A1 * | 6/2013 | Fripp | E21B 34/08 166/373 |
| 2017/0254426 | A1 * | 9/2017 | Hampton | F16K 99/0021 |

OTHER PUBLICATIONS

Thompson et al (2011) Investigation of a flat-plate oscillating heat pipe with Tesla-type check valves. Experimental Thermal and Fluid Science 35(7):1265-1273.

Forster et al (1995) Design, fabrication and testing of fixed-valve micro-pumps. Proceedings of the Fluids Engineering Division of the ASME-FED Jan. 1995; 234.

Morganti et al (2005) Microfluidics for the treatment of the hydrocephalus. Proc. 1st Int. Conf. on Sensing Technology Jan. 2005.

Stemme et al (1993) A Valveless Diffuser/Nozzle-based Fluid Pump. Sensors and Actuators A Physical (Impact Factor: 1.9). Nov. 1993; 39(2):159-167. DOI: 10.1016/0924-4247(93)80213-Z.

Andersson et al (2001) A Valve-less diffuser micropump for microfluidic analytical systems. Sensors and Actuators B Chemical (Impact Factor: 4.1). Feb. 2001; 72:259-265. DOI: 10.1016/S0925-4005(00)00644-4.

Olsson et al (1997) Micromachined flat-walled valveless diffuser pumps. Microelectromechanical Systems, Journal of (vol. 6, Issue: 2):161-166.

Bardell et al (2000) The Diodicity Mechanism of Tesla-Type No-Moving-Parts Valves. PhD thesis.

Gamboa et al (2005) Improvements in Fixed-Valve Micropump Performance Through Shape Optimization of Valves. Journal of Fluids Engineering (Impact Factor: 0.93) Jan. 2005; 127(2).

Pingen et al (2008) Optimal design for fluidic systems: Topology and shape optimization with the lattice Boltzmann method. PhD Thesis.

Pingen et al (2008) A parallel Schur complement solver for the solution of the adjoint steady-state lattice Boltzmann equations: application to design optimisation. International Journal of Computational Fluid Dynamics vol. 22, Issue 7:457-464.

Cabuk et al (1992) Optimum plane diffusers in laminar flow. Journal of Fluid Mechanics / vol. 237 / Apr. 1992, pp. 373-393.

Liu et al (2012) Optimization of micro Venturi diode in steady flow at low Reynolds number. Engineering Optimization (Impact Factor: 1.08). Nov. 2012; 44(11):1389-1404.

Borrvall et al (2003) Topology optimization of fluids in Stokes flow. International Journal for Numerical Methods in Fluids 41(1):77-107.

Guest et al (2009) Topology optimization with multiple phase projection. Computer Methods in Applied Mechanics and Engineering 199:123-135.

* cited by examiner

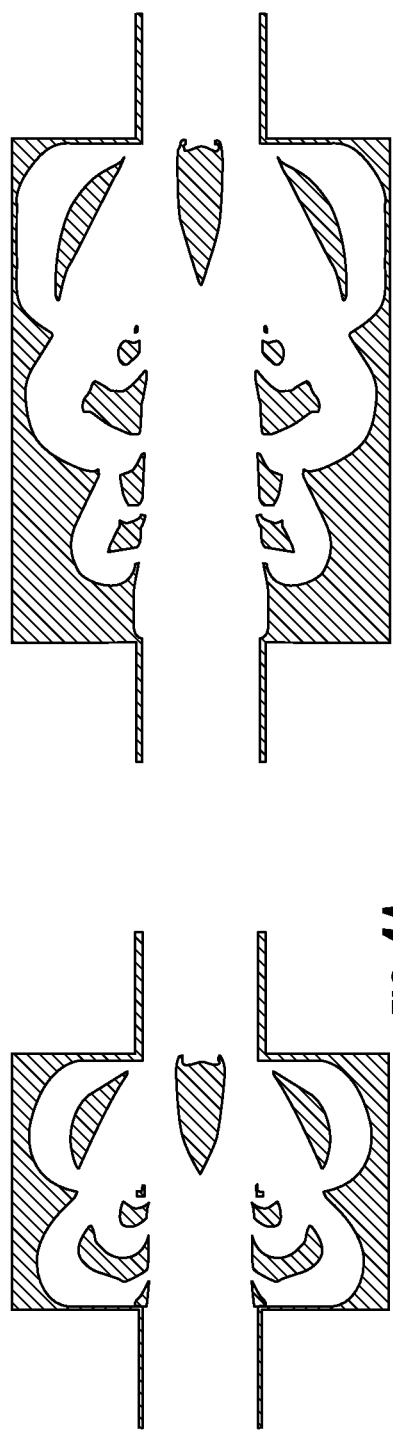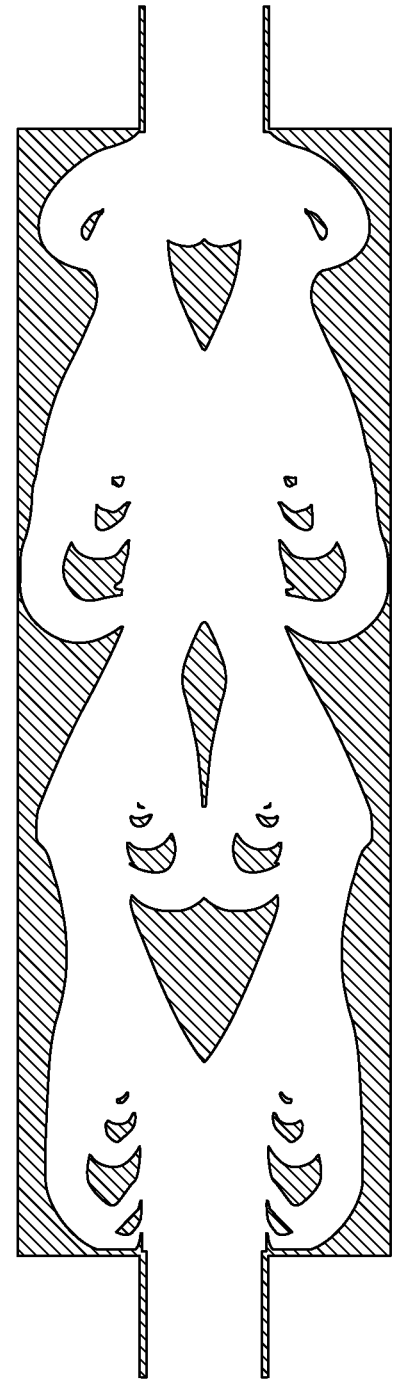
FIG. 4A ASPECT RATIO 2:3
FIG. 4B ASPECT RATIO 4:3
FIG. 4C ASPECT RATIO 9:3

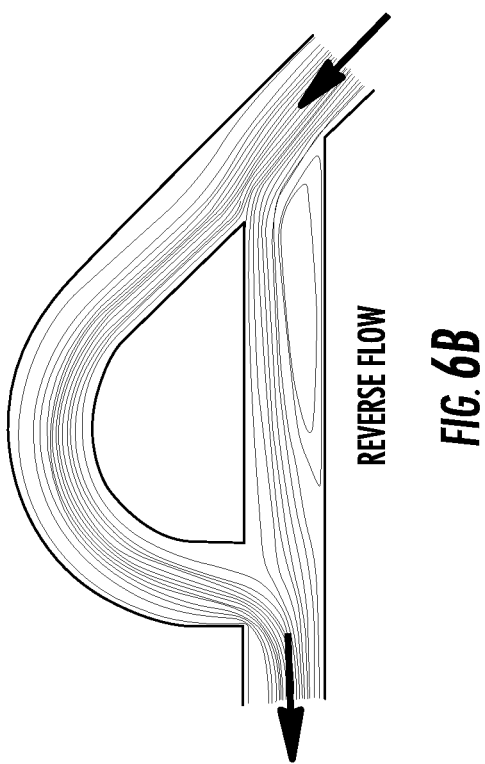
FIG. 6B REVERSE FLOW
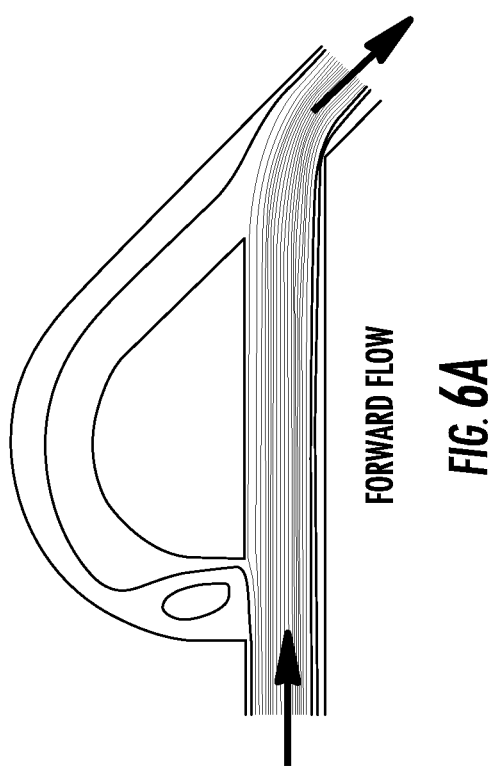
FIG. 6A FORWARD FLOW

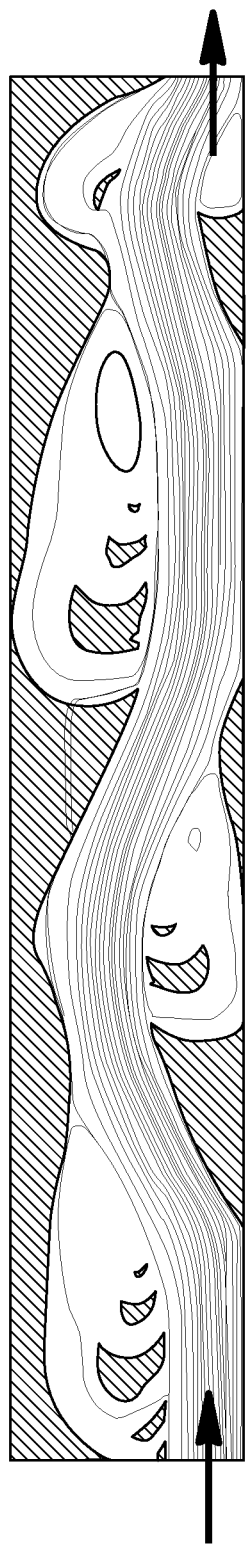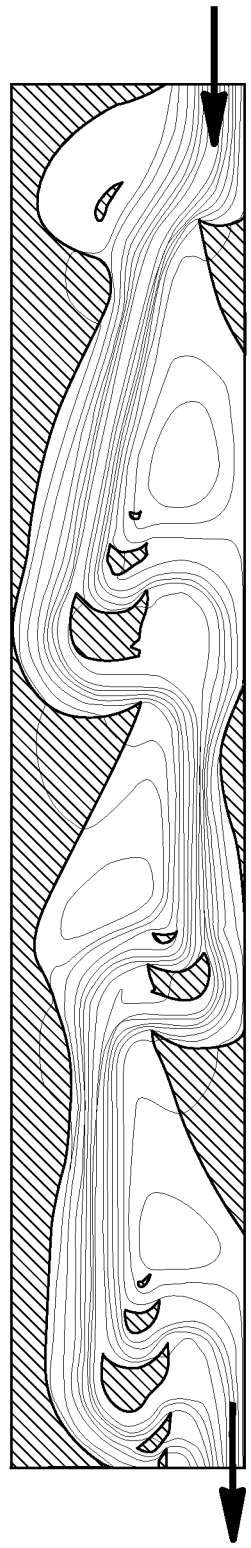
FIG. 7A  FORWARD FLOW
FIG. 7B  REVERSE FLOW

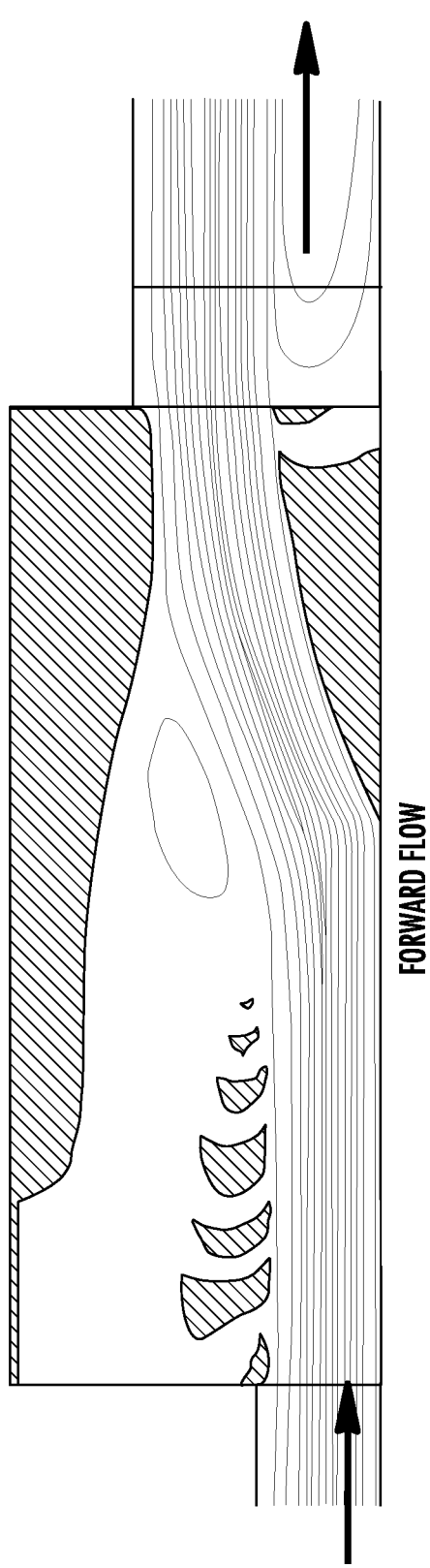
FIG. 9A — FORWARD FLOW
FIG. 9B — REVERSE FLOW

CUBOID DIODE FABRICATED USING FAST PROTOTYPING.

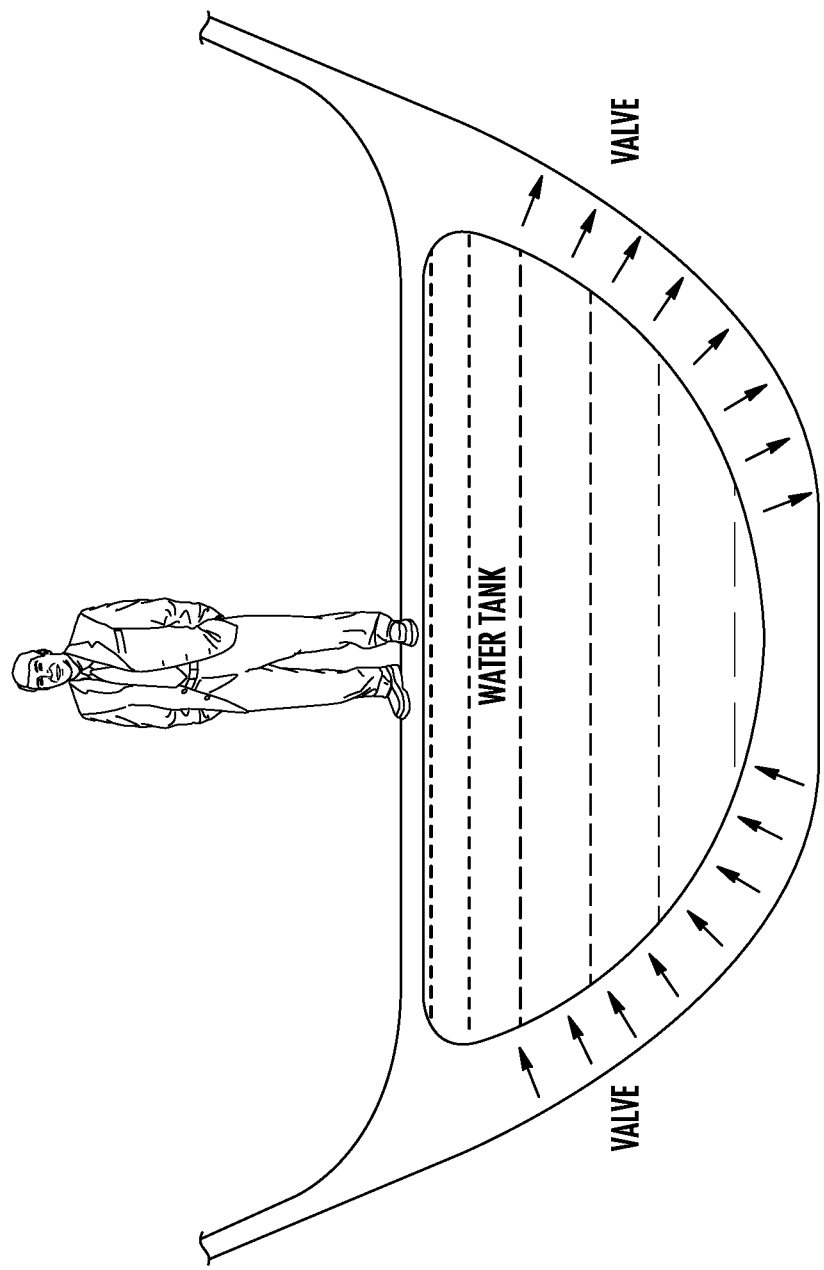

PASSIVE DIODE-LIKE DEVICE FOR FLUIDS

CROSS REFERENCE TO RELATED APPLICATIONS

This application is a Continuation of U.S. patent application Ser. No. 14/683,657, filed Apr. 10, 2015, which claims the benefit of U.S. Provisional Patent Application No. 62/041,712 filed Aug. 26, 2014, the content of each of the aforementioned applications is herein incorporated by reference in their entirety.

FIELD OF THE INVENTION

The present invention relates generally to fluid systems. More particularly, the present invention relates to a passive diode-like device for fluids.

BACKGROUND OF THE INVENTION

A check valves is a device to control flow direction in fluid systems. By actuation mechanisms, they can be grouped into three categories: active valve is actuated by external forces; passive valve such as Domino valve is actuated by fluid motion; fixed-geometry or No-Moving-Part (NMP) valve does not require external power and has no moving mechanical parts or deformable structures, instead it allows easy passage of forward flow and discourages reverse flow utilizing fluidic force. The latter two types together are usually referred to as a fluid diode.

A fixed-geometry fluid diode with flat-walled structures (denoted as fluid diode hereinafter), i.e., a Tesla valve and diffuser. A Tesla valve is composed of a straight and an embowed channel, and it utilizes inertial effect to drive part of reverse flow to the embowed channel thus dissipates its energy. A diffuser is a flow channel with expanding cross-section, and no doubt that flow in this direction requires smaller driving pressure. The essential difference between Tesla valve and diffuser is the outlet/inlet width. FIGS. 1A and 1B illustrate exemplary fixed-geometry fluid diodes with flat walled structures.

A fixed-geometry diode cannot completely stop reverse flow, but they are advantageous due to easy fabrication, robustness, capability of handling particle-laden, multi-phase, oscillating flow. Therefore, they are widely employed in many varied applications. For instance an integrated Tesla valve into a flat-plate oscillating heat pipe to achieve circulatory flow, a constructed miniature valve-less membrane pumps using Tesla valve as fluidic rectifiers, and a diffuser is frequently used in fluid pumps. The original Tesla valve requires inflow and outflow ports to be specifically positioned and oriented. Fluid enters at the bottom the device with a large vertical component of velocity and exits on the side of the device with only horizontal components of velocity.

Accordingly, there is a need in the art for a fluid diode design that allows alignment of inlet and outlet ports and inflow and outflow to be in the same direction and allows for substantial improvement of the diodicity.

SUMMARY OF THE INVENTION

The foregoing needs are met, to a great extent, by the present invention which provides a fluid flow device having an inlet and an outlet. The device also includes a network of fluid channels disposed between the inlet and the outlet. The network of fluid channels has an optimized fluid connectivity and optimized shapes to improve diodicity of the fluid flow device. The inlet and the outlet are in fluid communication.

In accordance with an aspect of the present invention, the inlet and the outlet are aligned. Inflow and outflow are in a same direction. A position of fluid channels in the network of fluid channels is determined using topology optimization method. The network of fluid channels is configured to have a Reynolds number between 100 and 300. The network of fluid channels is configured to have a local Reynolds number that is higher than a general Reynolds number for the device. The network of fluid channels is also configured to have a Darcy number that decreases gradually with iterations from a large value to a small one. The network of fluid channels is configured with an elemental porosity that is determined by nodal porosity through projection. The fluid flow device can have a Reynolds number of 100, a Darcy number of $4.4 \times 10^{-7}$, and weight coefficient of 0. The device has an aspect ratio selected from a group of 2:3, 4:3, and 9:3. The network of fluid channels is configured such that a predetermined amount of forward flow travels through a shorter and straight channel and a predetermined amount of forward flow travels through a side arc channel. The fluid flow device can also have a Reynolds number of 300, a Darcy number of $3 \times 10^{-5}$, and an aspect ratio of 9:3. The outlet width is configured such that the fluid flow device is a diffuser-type diode.

In accordance with another aspect of the present invention, a method of manufacturing a fluid flow device includes positioning a fluid inflow and a fluid outflow aligned in a same plane. The method includes configuring a network of fluid flow channels such that the inlet and outlet are in fluid communication. The method includes positioning the network of fluid flow channels between the inlet and the outlet such that the network of fluid channels, such that the network of fluid flow channels has a predetermined fluid connectivity and predetermined shapes to provide a predetermined diodicity for the fluid flow device. Additionally, the method includes configuring the device to provide unidirectional fluid flow.

In accordance with another aspect of the present invention, the method includes configuring the fluid flow channels such that inflow and outflow are unidirectional, and using a topology optimization method to position channels in the network of fluid flow channels. The method includes configuring the network of fluid flow channels to have a Reynolds number between 100 and 300. Additionally the method includes configuring the network of fluid flow channels to have a local Reynolds number that is higher than a general Reynolds number for the device. The method includes configuring the network of fluid flow channels with an elemental porosity that is determined by nodal porosity through projection. The method also includes configuring the device to have an aspect ratio selected from a group consisting of 2:3, 4:3, and 9:3.

BRIEF DESCRIPTION OF THE DRAWINGS

The accompanying drawings provide visual representations, which will be used to more fully describe the representative embodiments disclosed herein and can be used by those skilled in the art to better understand them and their inherent advantages. In these drawings, like reference numerals identify corresponding elements and:

FIGS. 4A-4C illustrate schematic diagrams of optimization results for different aspect ratios (Re=300, Da=3×10⁻⁵, W=0.1).

FIGS. 6A and 6B illustrate schematic flow diagrams of a Tesla valve with Re=300.

FIGS. 7A and 7B illustrate a schematic diagram of optimized fluid diode flow (Re=300, Da=3×10⁻⁵, aspect ratio=9:3).

FIGS. 9A and 9B illustrate a schematic diagram of a streamline of an optimized diffuser-type diode (Re=300, Da=3×10⁻⁵).

FIG. 17 illustrates an schematic diagram of an exemplary embodiment of a wave glider using a Tesla valve, according to an embodiment of the present invention.

DETAILED DESCRIPTION

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains, having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

The present invention is directed to an improved fluid diode using topology optimization with Finite Element Method (FEM). Topology optimization as a flexible optimization method has been extended to the fluid field. For given boundary conditions and constraints, it distributes a specific amount of pores (or removes materials to create channels) in the design domain to minimize/maximize an objective function. In this design, inlet and outlet ports are aligned and inflow and outflow are in the same direction. The present invention features an intricate network of fluid channels having optimized fluid connectivity and shapes, which significantly improves the diodicity of fluidic passive valves.

Performance of a fluid diode is measured by diodicity, which is defined as the ratio of pressure drop of reverse flow to that of the forward flow $$Di = \Delta p_r / \Delta p_f \quad (1)$$

Obviously, the larger diodicity the better performance, and therefore the present invention is designed to improve diodicity in the optimization. It is natural to directly use the ratio in Eqn. (1) as the objective function. However, a more favorable way in numerical optimization is to choose an objective that takes the form of a volume integral of an energy function.

$$\Phi(u, p) = \int_\Omega \left[ \frac{\mu}{2} \sum_{i,j} \left( \frac{\partial u_i}{\partial x_j} + \frac{\partial u_j}{\partial x_i} \right)^2 + \sum_i \alpha(\gamma) u_i^2 \right] \quad (2)$$

In Eqn. (2) the first term of integrand is viscous dissipation for incompressible Newtonian flow, and the second term is power dissipation due to the artificial Darcy force.

Figure 1A:
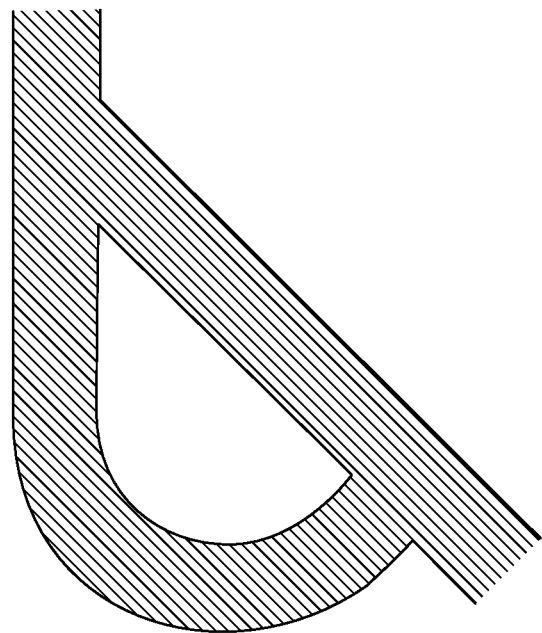
FIGS. 1A and 1B illustrate schematic diagrams of exemplary fixed-geometry fluid diodes with flat walled structures.
Figure 1B:
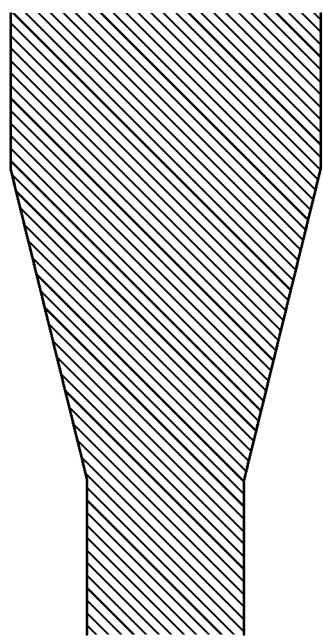
Figure 2:
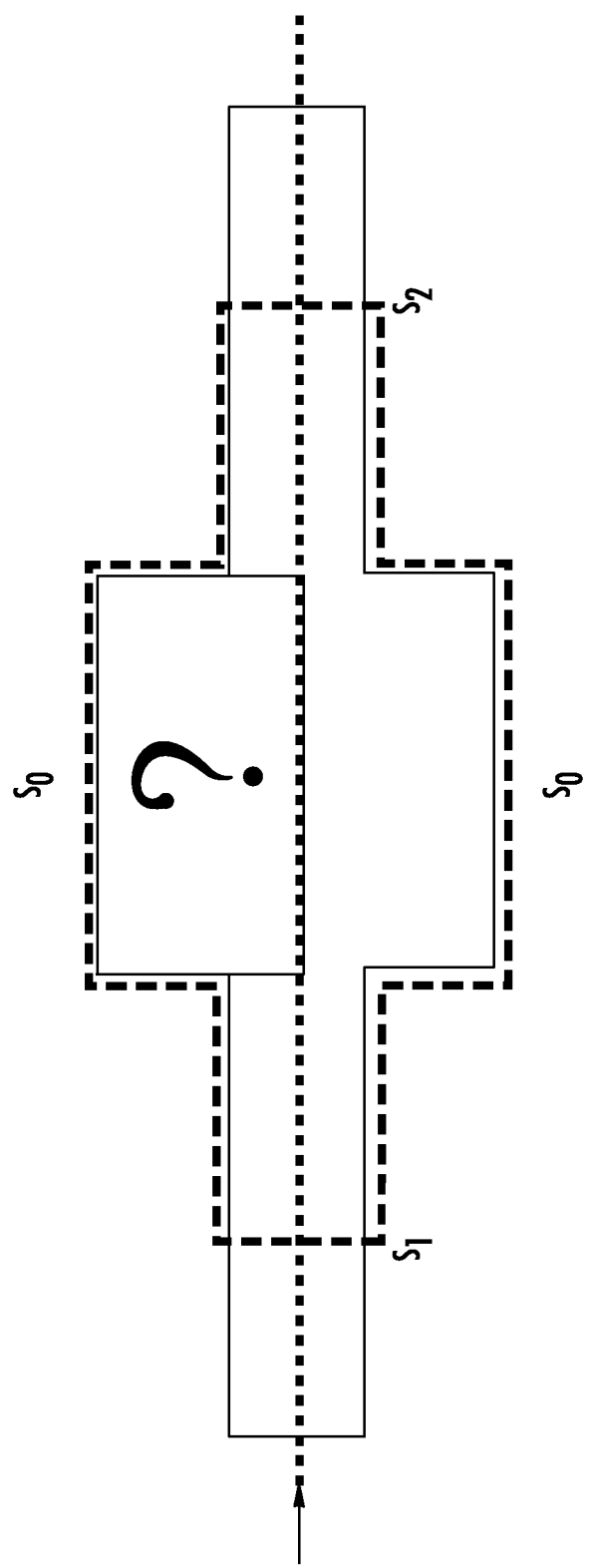
FIG. 2 illustrates a schematic diagram of a design domain for a Tesla valve, according to an embodiment of the present invention.

FIG. 2 illustrates a schematic diagram of a design domain for a Tesla valve, according to an embodiment of the present invention. Control volume, Ω, is shown by the dashed line. Dissipation is closely related with pressure drop, and therefore diodicity as the ratio of pressure drop can be defined using dissipation. As shown in FIG. 2, a control volume R can be selected in such a way that flows at upstream cross-section S1 and downstream cross-section S2 are fully developed. Dot product the steady momentum equation $$\rho u \cdot \nabla u = -\nabla p + \nabla \cdot \tau - \alpha u \quad (3)$$

by u, and with some math manipulations to obtain the mechanical energy equation, $$\nabla \cdot (u \tfrac{1}{2} \rho u^2) = -\nabla \cdot (pu) + \nabla \cdot (\tau \cdot u) - \tau : \nabla u - \alpha u^2 \quad (4)$$

where τ:∇u is viscous dissipation. For incompressible Newtonian fluid t=μ[∇u+(∇u)ᵀ], and $$\tau : \nabla u = \eta(\partial_i u_j + \partial_j u_i)\partial_j u_i = \sum_{i,j} \frac{\mu}{2}(\partial_j u_i + \partial_i u_j)^2 \quad (6)$$

which is exactly the same as the first integrand in Eqn. (2). Therefore, the energy equation can be rewritten as $$\tau:\nabla u+\alpha u^2=\nabla\cdot(\tau\cdot u-pu-\tfrac{1}{2}\rho u^2 u) \quad (6)$$

Integrate Eqn. (6) over the control volume $\Omega$ and use Divergence Theorem, $$\Phi=\int_\Omega \tau:\nabla u+\alpha u^2=\int_{\partial\Omega}[n\cdot\tau\cdot u-p(u\cdot n)-\tfrac{1}{2}\rho u^2(u\cdot n)] \quad (7)$$

where the boundary $\partial\Omega$ is composed of three segments, $\partial\Omega=S_0\cup S_1\cup S_2$. Due to the no-slip boundary condition on $S_0$, the following applies:

$$\Phi=\int_{S_1 S_2}[n\cdot\tau\cdot u+p(-u\cdot n)+\tfrac{1}{2}\rho u^2(-u\cdot n)] \quad (8)$$

The three terms can be greatly simplified for fully developed flow. The first term means work done by viscous stress. Because u and n are either in the same or opposite direction, it vanishes in fully developed flow:

$$u\cdot(\tau\cdot n)=\pm u(n\cdot\tau\cdot n)=\pm u\tau_{nn}=0 \quad (9)$$

Because pressure is constant along a cross-stream direction of fully developed flow, the second term, work done by pressure, can be rewritten as $$\int_{S_1 S_2} p(-u\cdot n)dS=p_1\int_{S_1}udS-p_2\int_{S_2}udS=\Delta p\cdot Q \quad (10)$$

where $Q=\int_{S_1} udS=\int_{S_2}$ is the flow rate, and $\Delta p=p_1-p_2$ is the pressure drop between S1 and S2. The third term is interpreted as mechanical energy convected into the control volume, and its integral is zero due to the same velocity profiles at $S_1$ and $S_2$. Therefore, the final simplified form is $$\Phi(u,p)=\Delta p\cdot Q \quad (11)$$

Equation (11) simply means that the power dissipated in the control volume W equals work done by the driving pressure. Then diodicity can be redefined as the ratio of power dissipation.

$$Di'=\frac{\Phi(u_r,p_r)}{\Phi(u_f,p_f)}=\frac{\Delta p_r\cdot Q_r}{\Delta p_f\cdot Q_f}=\frac{\Delta p_r}{\Delta p_f}=Di \quad (12)$$

From $\Delta p\sim\rho U^2$ for fast flow or $\Delta p\sim\mu U/L$ for viscous dominated flow, it can be concluded that if flow rate of forward and reverse flows are the same, the ratio of total power dissipation must be bounded, and Di' in Eq. (12) can serve as objective function. It is worth mentioning that in practice it is difficult and not necessary to ensure that flows at the upstream and downstream cross-sections are fully developed. In this case $Di'\approx Di$ The design domain in FIG. 2 is discretized using standard finite element mesh, then each element whose centroid located at $x_i$ is designated a element porosity $\gamma_i$, with $\gamma_i=1$ representing for fluid channel and $\gamma_i=0$ for solid phase.

To take advantage of gradient-based optimization algorithms, the design variables (element porosity $\gamma_i$) are allowed to take value continuously from 0 to 1. Accordingly, fluid is permitted to penetrate through intermediate and even solid phase, but the artificial flow is penalized by a Darcy damping force $f=-\alpha u$ which is proportional to local velocity in magnitude but in the opposite direction. The Darcy force is incorporated into Navier-Stokes equation as follows $$\rho(u\cdot\nabla)u=-\nabla p+\mu\nabla^2 u-\alpha(\gamma)u \quad (13)$$

In Eqn. (13), the physical meaning of a can be interpreted as local impermeability and it is related with material porosity $\gamma$ via $$\alpha(\gamma)=\underline{\alpha}+(\overline{\alpha}+\underline{\alpha})\frac{q(1-\gamma)}{q+\gamma} \quad (14)$$

where $\underline{\alpha}$ is the minimum allowable value of $\alpha$, $\overline{\alpha}$ the maximum allowable value, and q a parameter to control convexity of $\alpha(\gamma)$. If $\overline{\alpha}$ is infinitely large, then Eqn. (14) actually models the non-penetrable solid material in reality. However, in numerical practice it is extremely difficult to achieve infinity, and $\overline{\alpha}$ must be set to be a large number.

In general fluid topology optimization problems where dissipation is the objective to be minimized, velocity within solid phase is usually negligible, because the objective does not favor artificial flow. Unfortunately, in the diode design backward dissipation is being maximized which on the contrary encourages artificial flow. To alleviate artificial flow in reverse direction, a penalty term is added to the objective function. Non-dimensional Darcy force F• is defined as $$F_*=\frac{1}{L^2}\int_\Omega \frac{\alpha\sqrt{u_r^2+v_r^2}}{\overline{\alpha}U} \quad (15)$$

where U is characteristic velocity. Introducing weight coefficient W, in the optimization problem $(1/Di'+W\cdot F^*)$ can be minimized. Because F• is scaled to the similar order of magnitude with Di'~1, it follows that W~1.

To summarize, the optimization model is formulated as follows, $$\min: 1/Di'+F^* \quad (16a)$$

$$s.t.: \rho(u_f\nabla)u_f=-\nabla p_f+\mu\nabla^2 u_f-\alpha(\gamma)u_f \quad (16b)$$

$$\nabla\cdot u_f=0 \quad (16c)$$

$$\rho(u_r\cdot\nabla)u_r=-\nabla p_r+\mu\nabla^2 u_r-\alpha(\gamma)u_r \quad (16d)$$

$$\nabla\cdot u_r=0 \quad (16e)$$

$$0\leq\gamma\leq 1 \quad (16f)$$

For the purpose of generality, two dimensionless numbers are used to characterize the optimization parameters. Reynolds number is defined as $$Re=\frac{\rho U^2}{\mu U/L}=\frac{\rho UL}{\mu} \quad (17)$$

and is interpreted as the ratio of inertial to viscous effects. As Reynolds number goes too high, it is expensive and not accurate to solve Navier-Stokes equation, while the diodicity relies on inertial effect which grows stronger as flow goes faster. A compromise has to be made in choosing value of Reynolds number, and it was found that $100\leq Re\leq 300$ is good enough in order to get magnificat diodicity effect without much trouble in solving the NS equation. It is valuable to mention that local Reynolds number may be higher than the general Reynolds number, because channel width at some position may be very small, as shown in FIGS. 4A-4C, and that is why the Reynolds number is restricted to be relatively small.

Darcy number is defined as the ratio of viscous force to Darcy damping force, $$Da=\frac{\mu U/L}{\overline{\alpha}LU}=\frac{\mu}{\overline{\alpha}L^2} \quad (18)$$

$\bar{\alpha}$ is determined by value of Da. Smaller Darcy number implies larger $\bar{\alpha}$ and less artificial flow, but overly small Da may lead to undesirable local minimum, therefore, Da should decrease gradually with iterations from a relatively large value to a sufficiently small one (Da~$10^{-5}$).

Figure 3B:
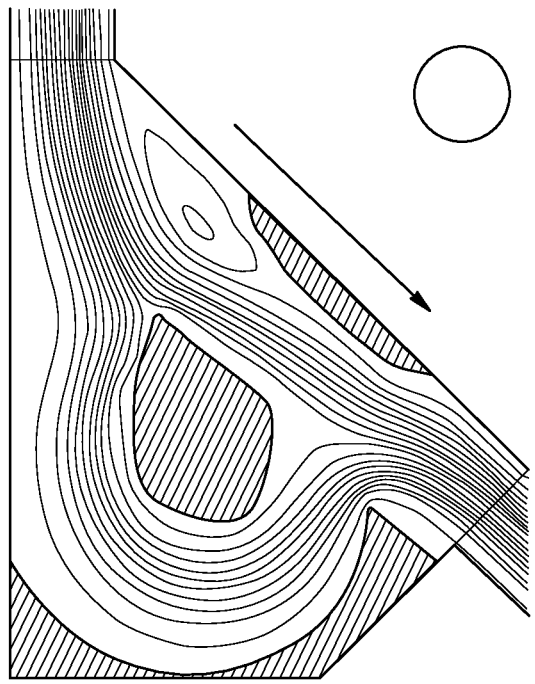
FIGS. 3A and 3B illustrate a schematic diagram of a reproduction of a Tesla valve using topology optimization with projection method (Re=100, Da=4.4×10⁻⁷, W=0). The circle in FIG. 3B illustrates a projection diameter and the flow lines represent magnitude controlled streamline of reverse flow.
Figure 3A:
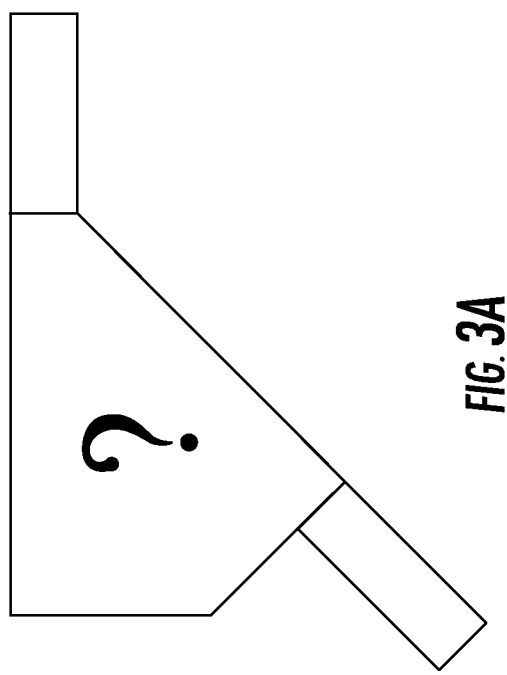

Using a pentagon design domain with inclined inlet and outlet, putting strong constraints on the minimum length scale of channels, a result that looks closely like the original valve design by Nicola Tesla is achieved. A projection method, is employed to exert minimum length scale constraints. The projection method mimics the processing of milling: it introduces a set of nodal porosity as design variable, and element porosity is determined by nodal porosity through projection, which performs morphological dilation operation on fluid phase. Therefore, any values of nodal design variables will result in element porosity with minimum length scale satisfied. FIGS. 3A and 3B illustrate a schematic diagram of a reproduction of a Tesla valve using topology optimization with projection method (Re=100, Da=$4.4\times10^{-7}$, W=0). The circle in FIG. 3B illustrates a projection diameter and the flow lines represent magnitude controlled streamline of reverse flow.

The optimal result depends on aspect ratio (ratio of width and height) of the rectangular design domain. FIGS. 4A-4C illustrate schematic diagrams of optimization results for different aspect ratios (Re=300, Da=$3\times10^{-5}$, W=0.1). FIGS. 4A-4C gives several solutions for different value of aspect ratio. As shown in the figures, although optimal results differ from each other, they all remain in a similar pattern. For a longer diode with larger aspect ratio, repetition of channels is found that occurred in shorter diodes. In some applications, it is more favorable to adopt longer fluid diodes that can also serve as flow channel. Here in FIG. 4C a diode example is shown with a large aspect ratio (9:3).

Figure 5:
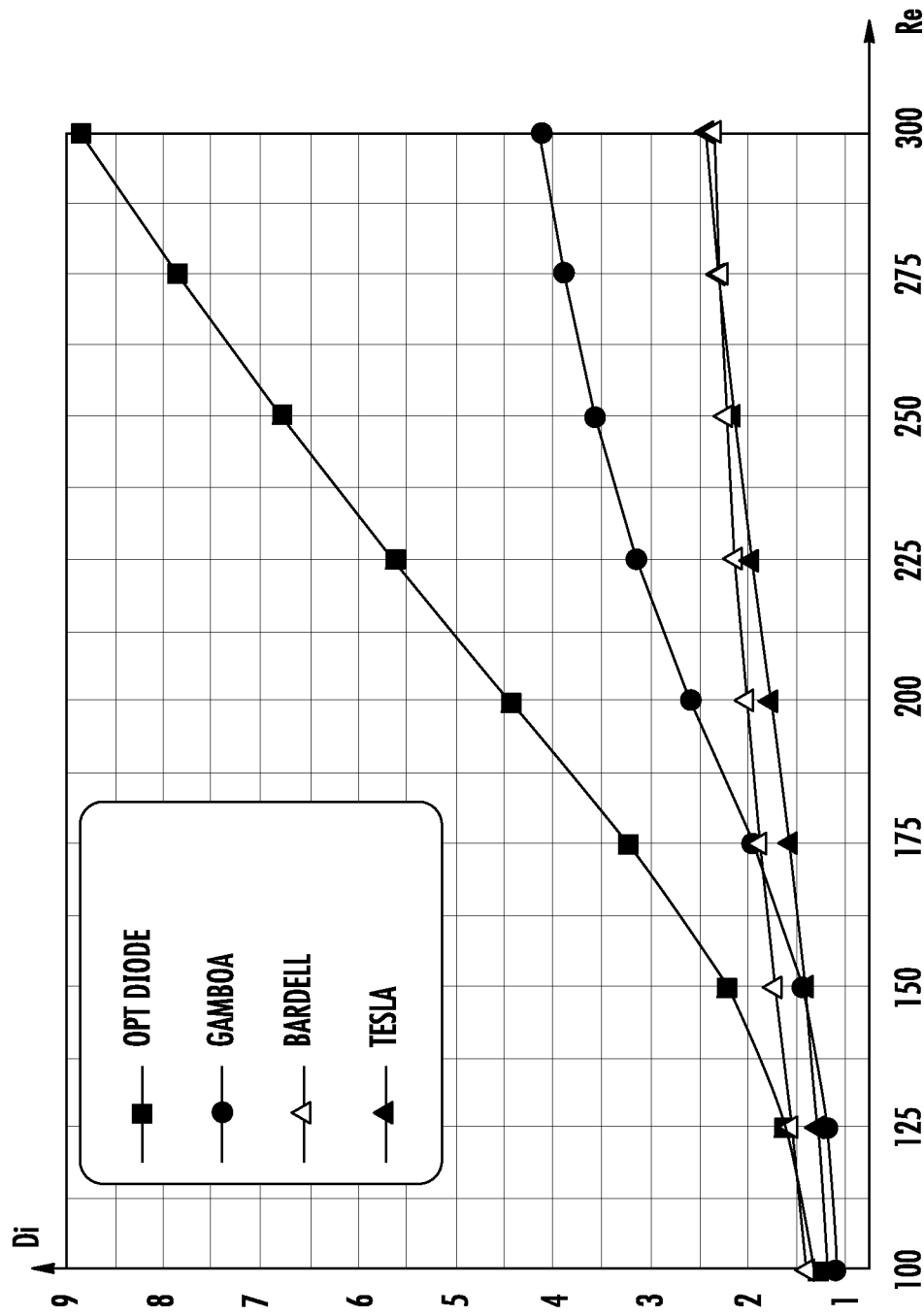
FIG. 5 illustrates a graphical view of a comparison of diodicity of channel-like diode and published optimizations.

Diodicity performance of the diode in FIG. 4C is compared with other implementations and shown in FIG. 5. FIG. 5 illustrates a graphical view of a comparison of diodicity of a channel-like diode and published optimizations.

In all of the results shown in FIGS. 4A-4C, many channels similar to the original Tesla valve can be found. This implies that a diodicity mechanism for a Tesla valve and optimized diode are the same. FIGS. 4A-4C give a streamlined view of forward flow and reverse flow. The majority of forward flow goes through the shorter and straight channel while the side arc channel receives little flow; for the reverse case larger portion of flow passes via the side arc channel. A similar situation is observed in the optimized diode (FIGS. 4A-4C). FIGS. 6A and 6B illustrate schematic flow diagrams of a Tesla valve with Re=300. FIGS. 7A and 7B illustrate a schematic diagram of optimized fluid diode flow (Re=300, Da=$3\times10^{-5}$, aspect ratio=9:3).

Figure 8:
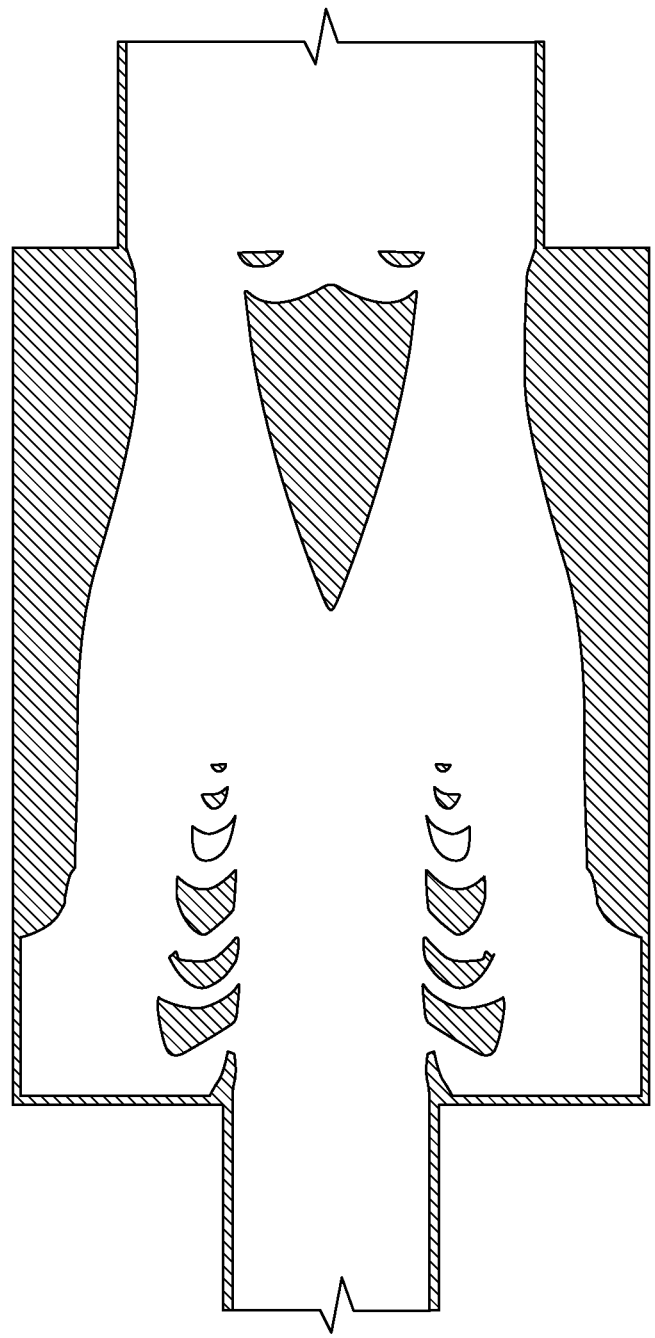
FIG. 8 illustrates a schematic diagram of an optimization result of a diffuser-type diode (Re=300, Da=3×10⁻⁵, W=0, aspect ratio=4:3).

A diffuser features an expanding channel width. Therefore, the proposed method can be used to design a diffuser-like fluid diode with only modification of outlet width. FIG. 8 illustrates a schematic diagram of a optimization result of a diffuser-type diode (Re=300, Da=$3\times10^{-5}$, W=0, aspect ratio=4:3). FIG. 8 shows the optimization result. Streamline in FIGS. 9A and 9B shows that forward flow passes through the diode as if it is a real diffuser, while the reverse flow is separated into two parts and both of them undergo large resistance through side channels.

Figure 10A:
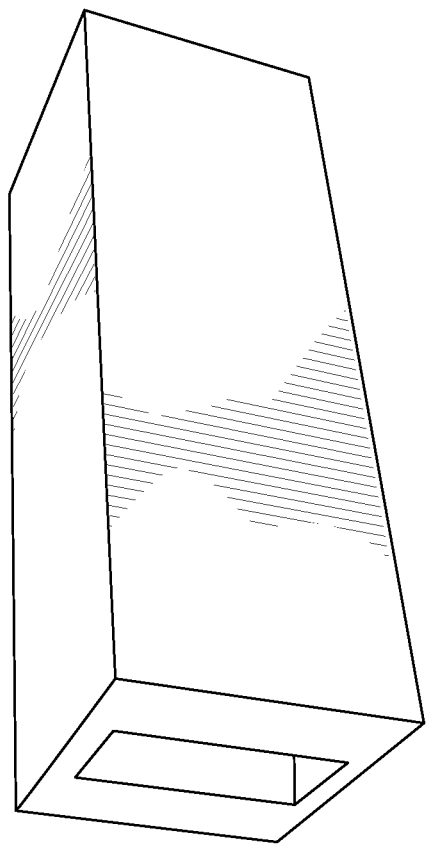
FIG. 10A illustrates an image of a cuboid diode fabricated using fast prototyping.
Figure 10B:
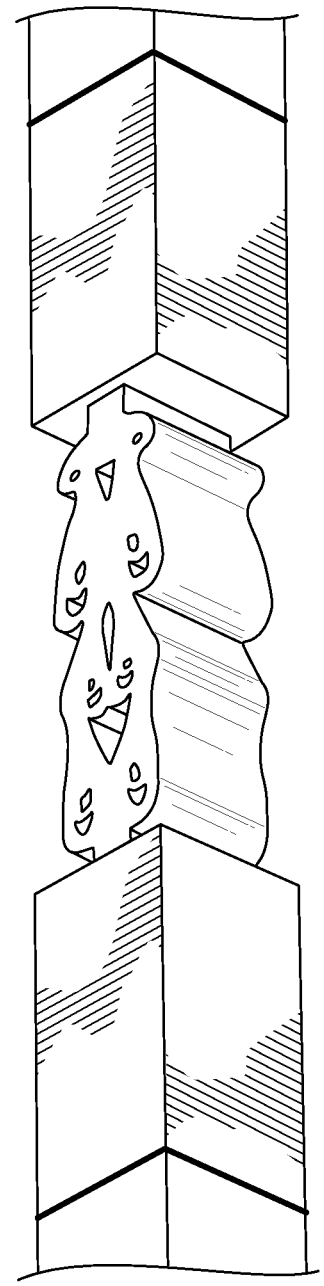
FIG. 10B illustrates a schematic diagram of a fluid phase of an experiment setup. The position of pressure measurement is marked with lines.

The optimized diode in FIG. 4C is extruded to get a 3D model illustrated in FIG. 10A and then fabricated with fast prototyping (a.k.a., 3D printing). To utilize existing equipment, the diode is fabricated as a 1×1×3 inch plastic cuboid, whose inner void constitutes flow channels. The whole cuboid is placed into a long duct with a one inch square cross-section. Pressure was measured as difference under different flow rates between the two positions marked with lines in FIG. 10B. In the experiment, pressure difference was measured with an OMEGA HHP-803/SIL differential pressure meter to an accuracy of 0.01 psi and flow rate was achieved with an OMEGA FTB602B-T flow meter with an accuracy of 1%. Deionized water was used as working fluid with viscosity to be 1.002 cP at 20° C. measured by a Brookfield LVDVII+ PRO viscometer.

Figure 11:
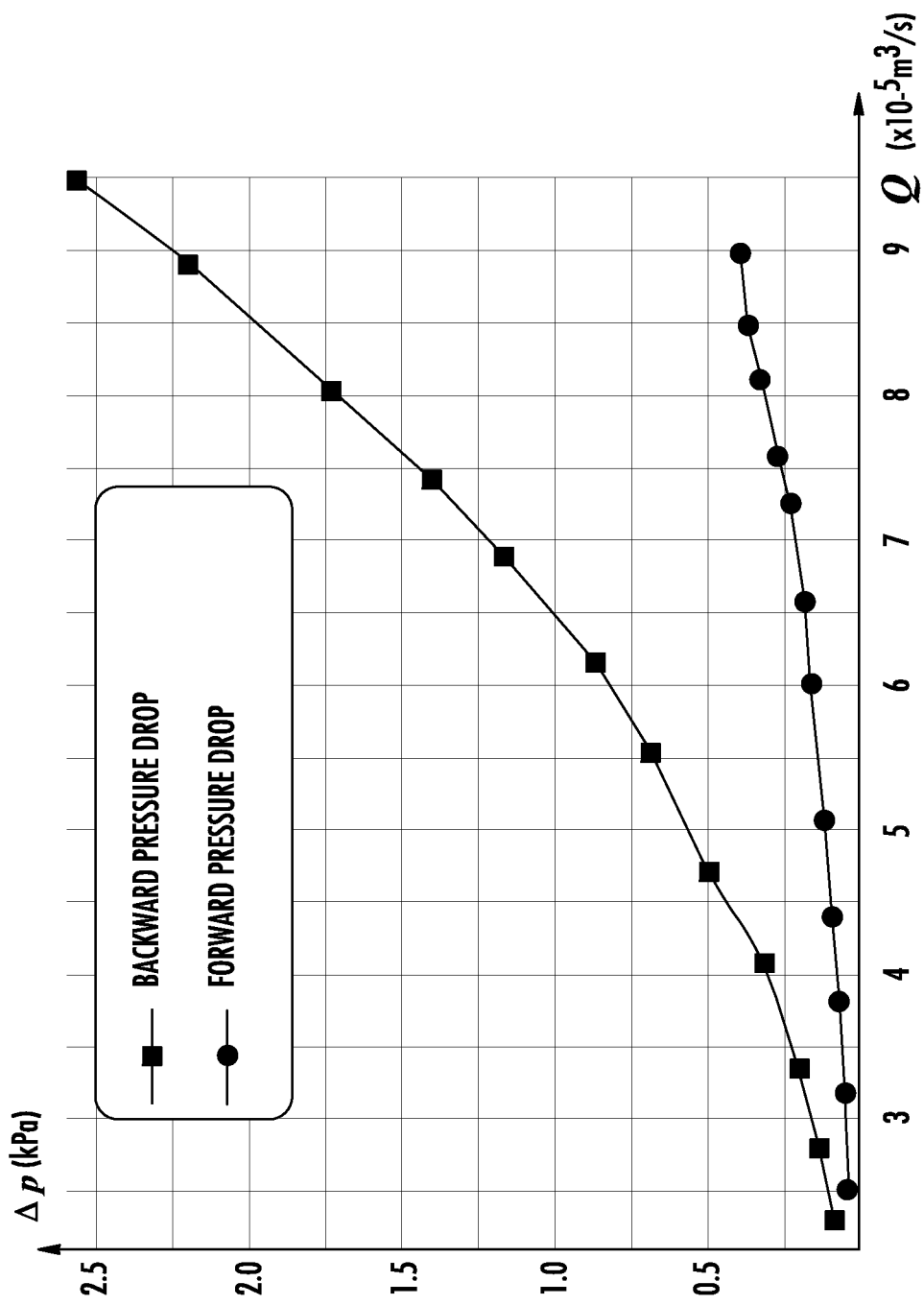
FIG. 11 illustrates a graphical view of an experimental pressure drop of the optimized fluid diode. The x-axis represents flow rate and the y-axis represents pressure drop.

Obviously, the fabrication and experiment scheme harms the measured diodicity by introducing isotropic flow resistance or pressure loss for both forward and reverse flows, because diodicity is defined as the ratio of pressure loss in two direction. There are mainly three sources of isotropic pressure loss: (1) The abrupt change of cross-section near inlet and outlet; (2) Rough inner surface of the 3D printed cuboid; (3) The long distance between diode exit and pressure measure position. Nevertheless, the cuboid diode still shows significant diodicity, as illustrated in FIG. 11. FIG. 11 illustrates a graphical view of an experimental pressure drop of the optimized fluid diode. The x-axis represents flow rate and the y-axis represents pressure drop.

Figure 12:
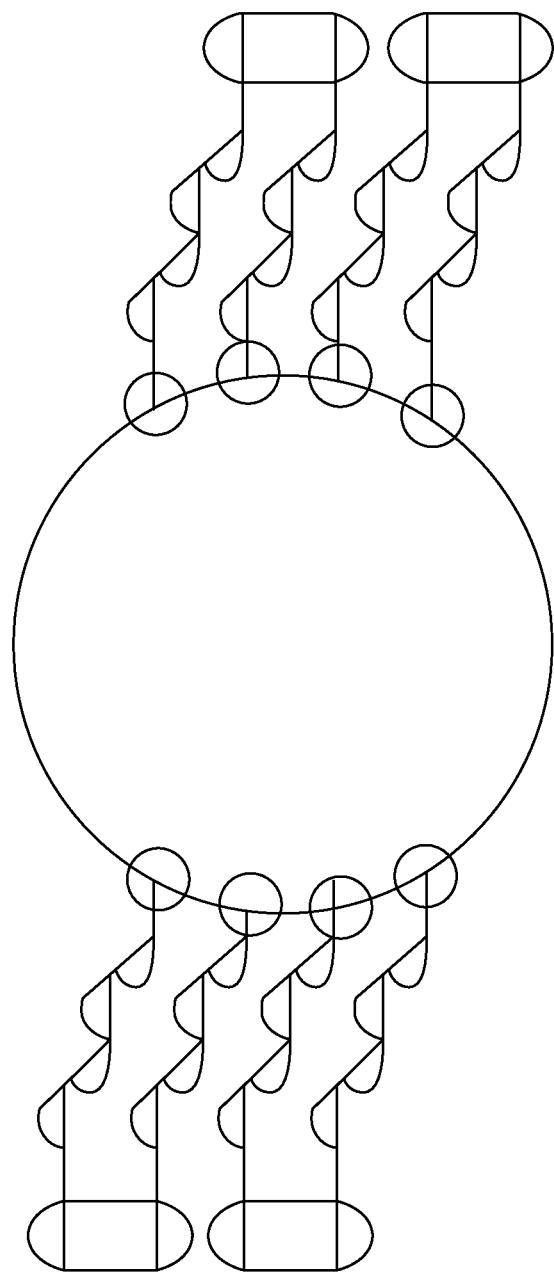
FIG. 12 illustrates a schematic diagram of a Forster pump, according to an embodiment of the present invention.
Figure 13:
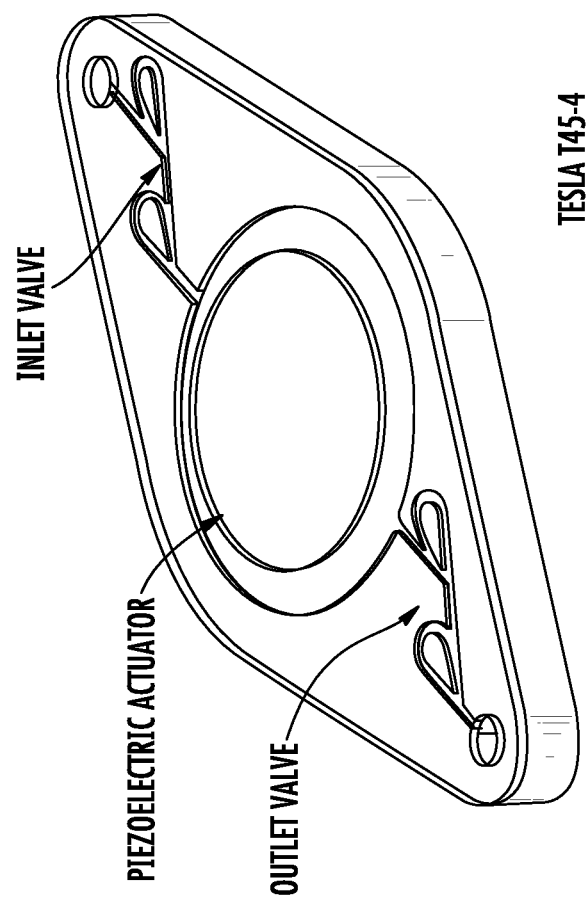
FIG. 13 illustrates a schematic diagram of micropump with a Tesla valve in a commercial lab-on-a-chip, according to an embodiment of the present invention. The lab-on-a-chip, includes a piezoelectric actuator that is driven by flow through an inlet valve and an outlet valve.
Figure 14:
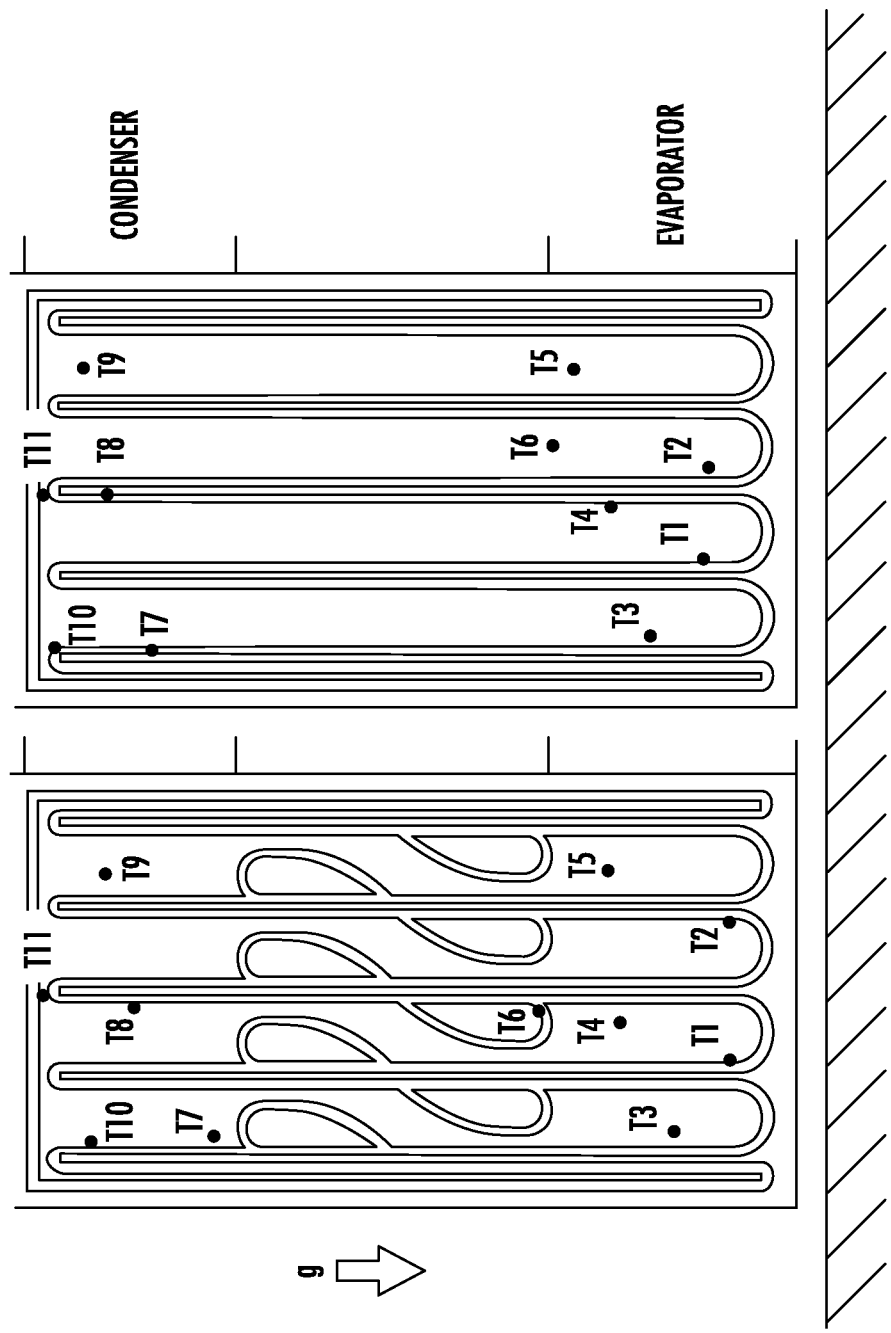
FIGS. 14A and 14B illustrate schematic diagrams of an oscillating heat pipe according to an embodiment of the present invention. The heat pipe includes a condenser and an evaporator that include Tesla-type check valves.
Figure 15:
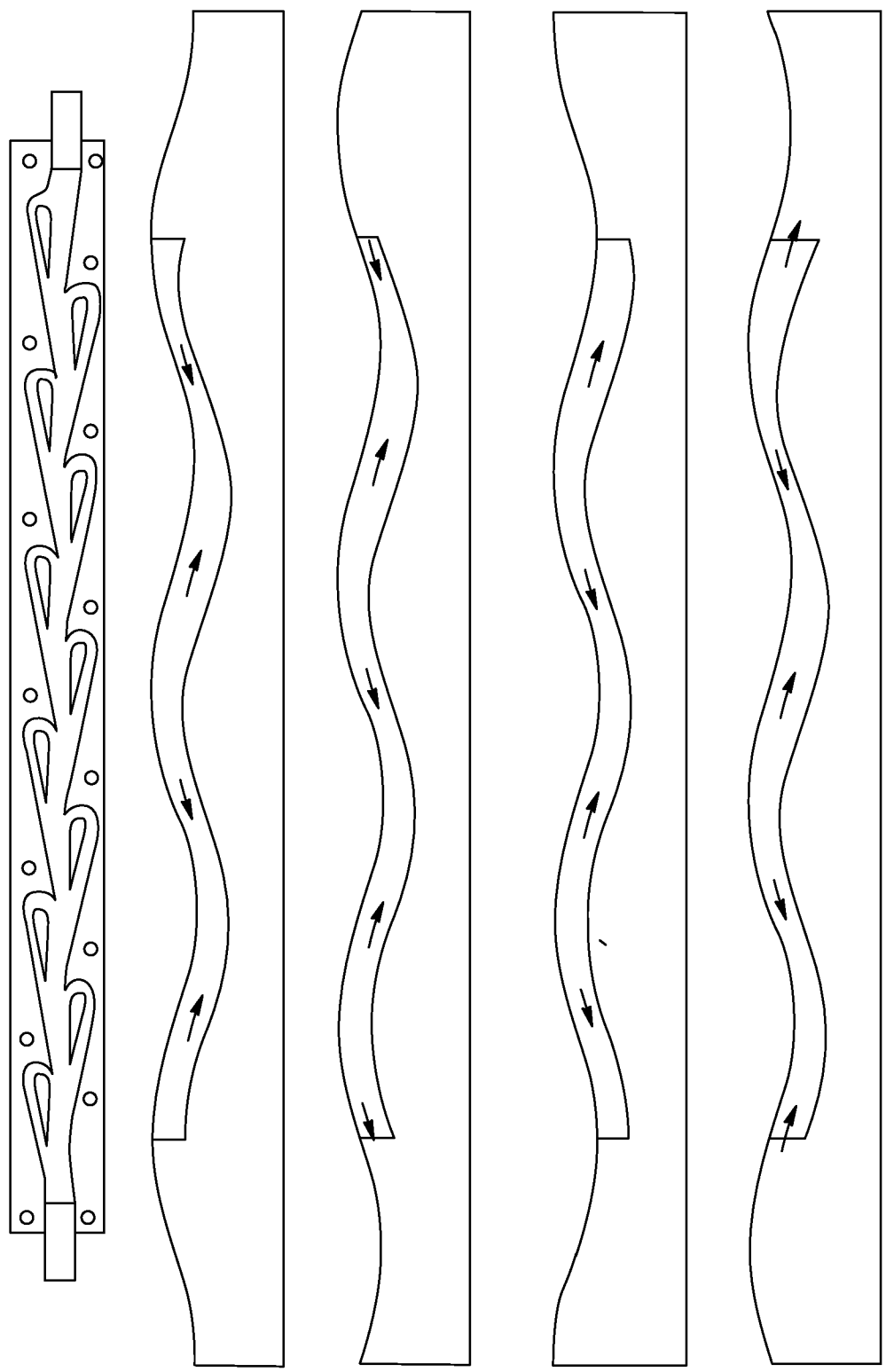
FIG. 15 illustrates a method for using a Tesla valve to harness water waves, according to an embodiment of the present invention.
Figure 16:
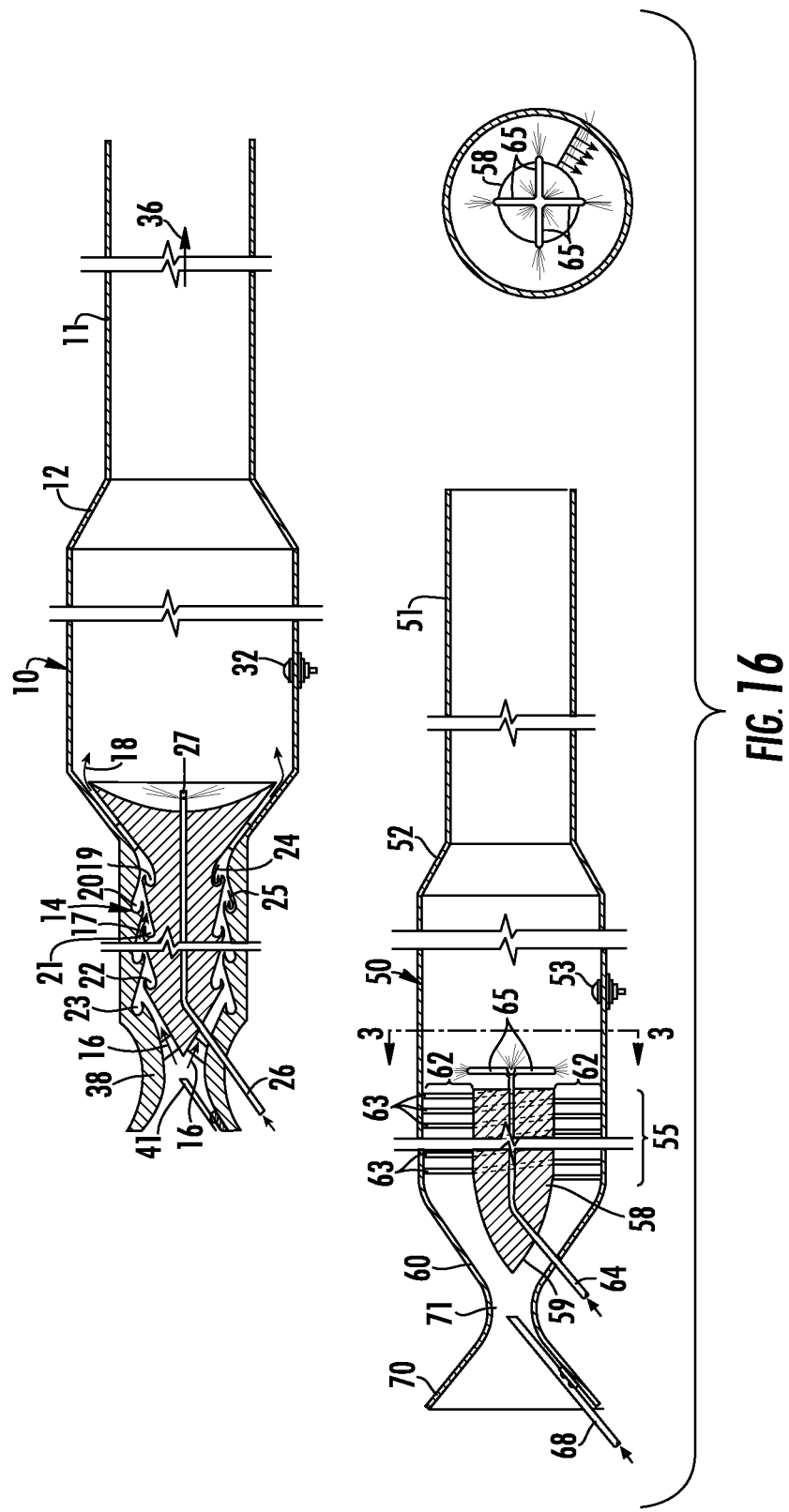
FIG. 16 illustrates a method for controlling flow direction in a pulse jet, according to an embodiment of the present invention.

FIGS. 12-17 illustrate exemplary implementations of the diode described herein. FIG. 12 illustrates a Forster pump, according to an embodiment of the present invention. The central chamber expands and contracts alternatively. Therefore, fluid is drawn in, in one direction and is pushed out, in the other direction. The design of the present invention, described above, converts oscillating flow to directional flow. FIG. 13 illustrates a micropump with Tesla valves in a commercial lab-on-a-chip, according to an embodiment of the present invention. A piezoelectric actuator drives fluid to oscillate, and the Tesla valves work as a rectifier in the micro-pump, which is a critical component of a miniatured thermal management module. FIGS. 14A and 14B illustrate an oscillating heat pipe according to an embodiment of the present invention. An array of parallel pipes is placed between the condenser and evaporator, and working fluid (such as distilled water) travels in the pipe in an oscillating way to transport thermal energy from evaporator to condenser. Utilizing Tesla valve drives fluid flow in one direction and thus significantly improves efficiency in the heat pipe. FIG. 15 illustrates a method for using a Tesla valve to harness water waves, according to an embodiment of the present invention. The method converts the random fluctuation of water waves in the sea to directional flow, in order to generate electricity. A design according to an embodiment of the present invention could be used to actuate this method. FIG. 16 illustrates a method for controlling flow direction in a pulse jet, according to an embodiment of the present invention. In such a method, the easy-to-damage check valve in the pulse jet can be replaced by a Tesla valve, with a design as described above. By doing this, robustness and service life can be improved more than 10 times. Such a device could be used in micro drone or recreational gliders to provide propulsion. FIG. 17 illustrates an exemplary embodiment of a wave glider using an array of Tesla valves, according to an embodiment of the present invention. When water moves up and down the Tesla valves, according to an embodiment of the present invention, will generate a leftward propulsion. The design does not require a subwing, such that it can also be used in shallow water.

The many features and advantages of the invention are apparent from the detailed specification, and thus it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly all suitable modifications and equivalents may be resorted to, falling within the scope of the invention.

What is claimed is:

1. A fluid flow device comprising:
   an inlet;
   an outlet;
   a network of fluid channels disposed between the inlet and the outlet such that the network of fluid channels has a predetermined fluid connectivity and predetermined shapes to provide a predetermined diodicity for the fluid flow device, and such that the inlet and outlet are in fluid communication, and fluid flow is unidirectional; and
   material features (bodies) in the network of fluid channels wherein the material features comprise a first group of material features and a second group of material features, wherein members of the first group of material features are smaller in size than members of the second group of material features, wherein the members of the first group of material features are non-convex in shape, wherein at least three of the members of the first group of material features are at least three different shape types, and wherein the members of the first group of material features each have a major axis that is less than or equal to 90 degrees to a fluid flow direction of the inlet and the outlet.

2. The device of claim 1 wherein the inlet and the outlet are aligned.

3. The device of claim 1 wherein inflow and outflow are in a same direction.

4. The device of claim 1 wherein a position of fluid channels in the network of fluid channels is determined using topology optimization method.

5. The device of claim 1 further comprising the network of fluid channels being configured to have a Reynolds number between 100 and 300.

6. The device of claim 1 further comprising the network of fluid channels being configured to have a local Reynolds number that is higher than a general Reynolds number for the device.

7. The device of claim 1 further comprising the network of fluid channels being configured to have a Darcy number that decreases gradually with iterations from a large value to a small one.

8. The device of claim 1 further comprising the network of fluid channels being configured with an elemental porosity that is determined by nodal porosity through projection.

9. The device of claim 1 further comprising the fluid flow device having a Reynolds number of 100, a Darcy number of $4.4 \times 10^{-7}$, and weight coefficient is 0.

10. The device of claim 1 further comprising the device having an aspect ratio selected from a group consisting of 2:3, 4:3, and 9:3.

11. The device of claim 1 further comprising the network of fluid channels being configured such that a predetermined amount of forward flow travels through a shorter and straight channel and a predetermined amount of forward flow travels through a side arc channel.

12. The device of claim 1 further comprising the fluid flow device has a Reynolds number of 300, a Darcy number of $3 \times 10^{-5}$, and an aspect ratio of 9:3.

13. The device of claim 1 further comprising an outlet width configured such that the fluid flow device is a diffuser-type diode.

14. A method of manufacturing a fluid flow device comprising:
   positioning a fluid inflow and a fluid outflow aligned in a same plane;
   configuring a network of fluid flow channels such that the inlet and outlet are in fluid communication;
   positioning the network of fluid flow channels between the inlet and the outlet such that the network of fluid channels, such that the network of fluid flow channels has a predetermined fluid connectivity and predetermined shapes to provide a predetermined diodicity for the fluid flow device;
   positioning material features (bodies) in the network of fluid channels, wherein the material features comprise a first group of material features and a second group of material features, wherein members of the first group of material features are smaller in size than members of the second group of material features, wherein the members of the first group of material features are non-convex in shape, wherein at least three of the members of the first group of material features are at least three different shape types, and wherein the members of the first group of material features each have a major axis that is 90 degrees to a fluid flow direction of the inlet and the outlet; and
   configuring the device to provide unidirectional fluid flow.

15. The method of claim 14 further comprising configuring the fluid flow channels such that inflow and outflow are unidirectional.

16. The method of claim 14 further comprising using a topology optimization method to position channels in the network of fluid flow channels.

17. The method of claim 14 further comprising configuring the network of fluid flow channels to have a Reynolds number between 100 and 300.

18. The method of claim 14 further comprising configuring the network of fluid flow channels to have a local Reynolds number that is higher than a general Reynolds number for the device.

19. The method of claim 14 further comprising configuring the network of fluid flow channels with an elemental porosity that is determined by nodal porosity through projection.

20. The method of claim 14 further comprising configuring the device to have an aspect ratio selected from a group consisting of 2:3, 4:3, and 9:3.

* * * * *